Oct. 30, 1945.    H. T. AVERY    2,387,870
ACTUATING MECHANISM FOR REGISTERS
Filed Aug. 2, 1940    6 Sheets-Sheet 1

INVENTOR.
Harold T. Avery.
BY
Lyon & Lyon ATTORNEYS.

Oct. 30, 1945.  H. T. AVERY  2,387,870
ACTUATING MECHANISM FOR REGISTERS
Filed Aug. 2, 1940   6 Sheets-Sheet 2

FIG_1-A.

INVENTOR.
Harold T. Avery.
BY
Lyon & Lyon
ATTORNEY.

Patented Oct. 30, 1945

2,387,870

UNITED STATES PATENT OFFICE 2,387,870

ACTUATING MECHANISM FOR REGISTERS

Harold T. Avery, Oakland, Calif., assignor to Marchant Calculating Machine Company, a corporation of California Application August 2, 1940, Serial No. 349,940

3 Claims. (Cl. 235—79)

The present invention relates to actuating means for registers such as may be used in adding and calculating machines.

Most present day machines of this type employ a shiftable accumulator register containing indicating dials and a separate actuator of considerable size, weight, and cost, because in machines of this type there is necessarily provided in connection with each dial of the accumulator register, transmission mechanisms to transmit movement from the actuator to the dial, and pawling devices for preventing displacement of the dial when it is disconnected from the actuator.

It is an object of the present invention to provide a register in which each dial has a clutch unit directly and permanently associated therewith for selectively and positively coupling the dial to the driving mechanism for a predetermined interval of time to enter a desired value into that dial.

Thus, the present invention contemplates providing an independent actuating unit in the form of a clutch mechanism for each dial, and although the number of actuating units is thereby increased, the total cost and weight of the combined actuating and registering devices is substantially reduced, since the actuating, transmission, and registering mechanisms are combined into one unit in each order.

It is another object of the present invention to provide positive and reliable control mechanism for determining the interval of time during which each dial clutch is engaged to rotate its associated dial in accordance with the setting of a selectively settable mechanism.

It is yet another object of the present invention to furnish power-driven mechanism which is positively operable to engage a dial clutch of the type indicated at a fixed time and to selectively disengage said clutch after a predetermined extent of rotation of its associated dial.

Other objects of the present invention will become apparent from the following description of a preferred exemplary embodiment of the present invention illustrated in the accompanying drawings in which:

Fig. 1A is a general view of the machine;

DETAILED DESCRIPTION

As shown in Fig. 1A, the first embodiment of the invention is an adding and subtracting machine having a keyboard 1 containing a plurality of keys 100 arranged in eight orders, each order containing ten keys numbered consecutively from zero to nine. The machine includes a plurality of accumulator windows 2, one associated with each order of keys, and each displaying a number on an accumulator dial associated with that order of keys. The machine also has a plus actuating key or bar 200 and a minus actuating key or bar 220 to condition the machine for addition or subtraction, as desired. These keys also function to set the mechanism into operation. Thus if a number is to be added into the accumulator, it is first set up on the keys 100 and then the plus bar 200 is struck, whereupon the accumulator dials of the machine are motor-actuated to add the number set up into the accumulator. On the other hand, if the number is to be subtracted, then after the number is set up in the keys 100, the minus bar 220 is struck, which actuates the accumulator dials under the control of the keys 100 to subtract the number from the value in the accumulator.

Figures 1, 2, 3:
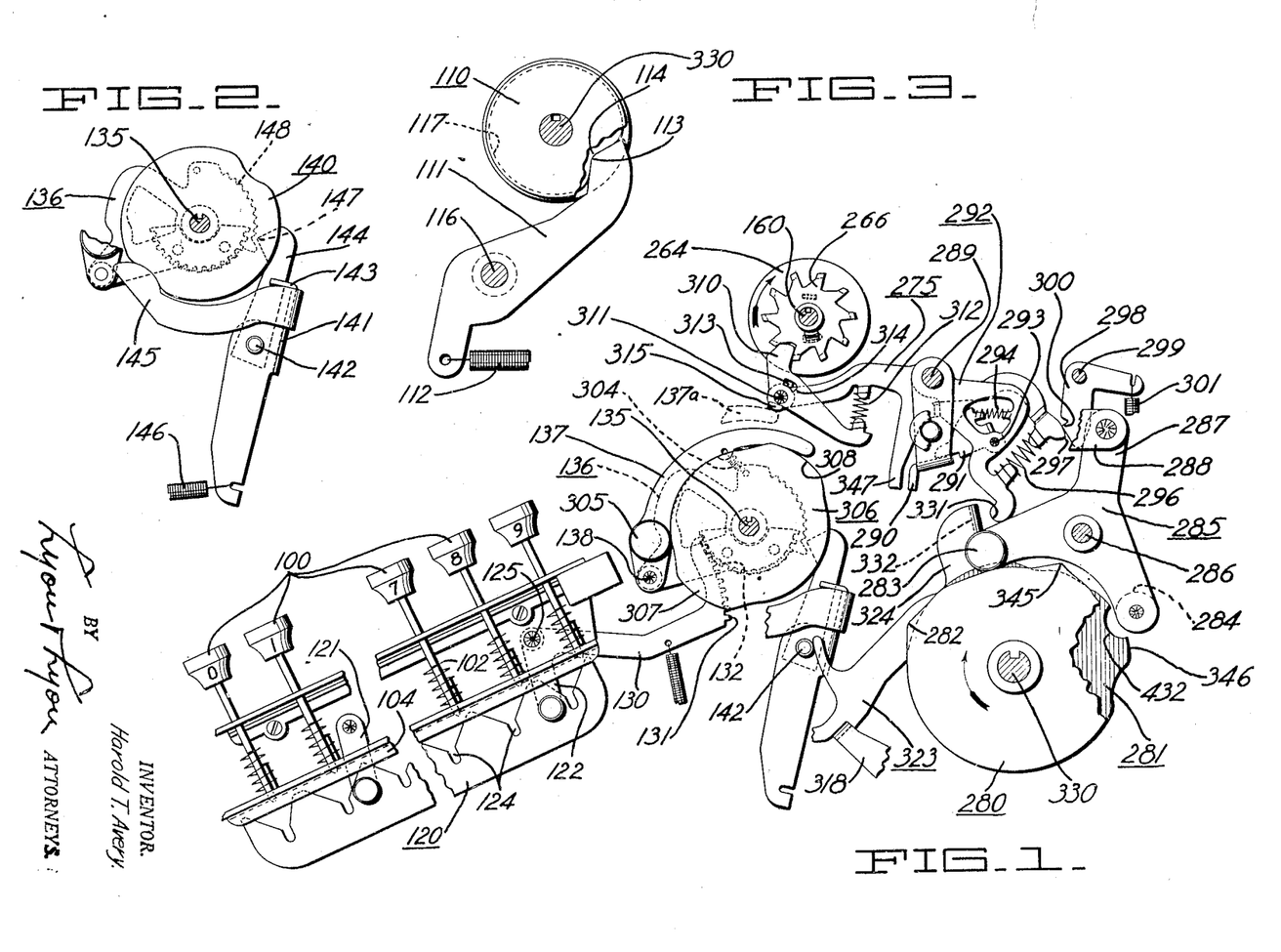
Fig. 1 is a right side skeleton view, showing the general arrangement of elements.
Fig. 2 is a right side view of the mechanism for locking the selection mechanism in the machine of Fig. 1.
Fig. 3 is a right side detail view of the mechanism for centralizing the main clutch.
Figure 1:
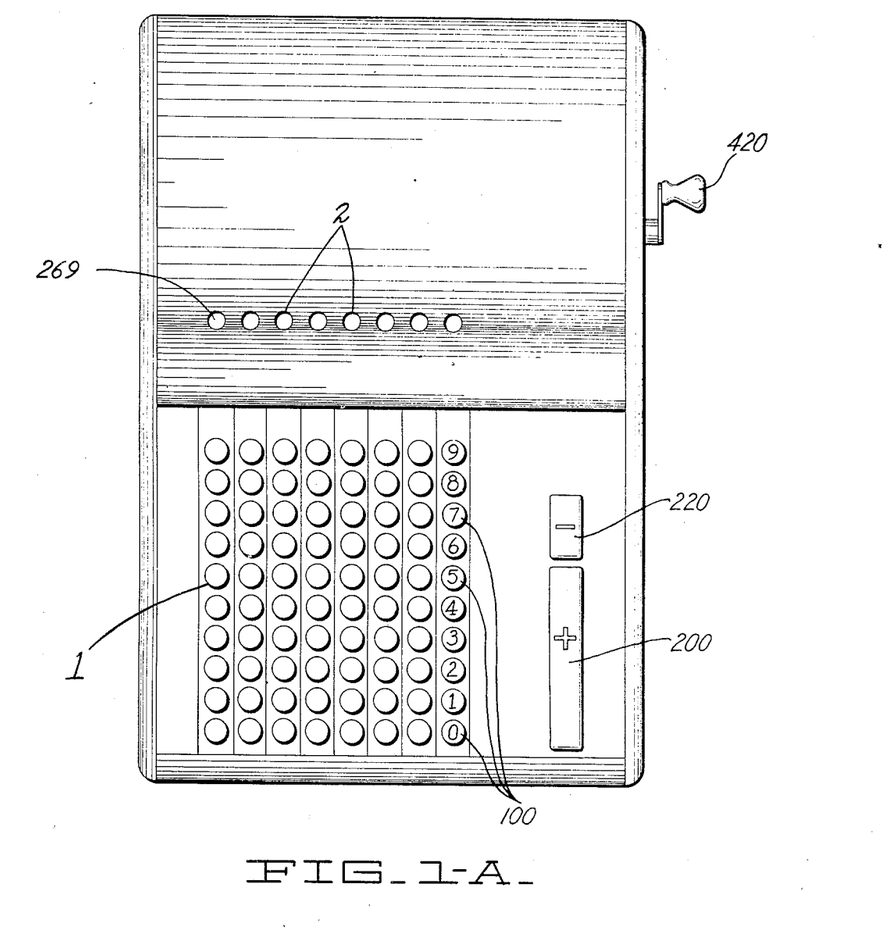

The chief elements of the machine will now be briefly outlined with reference to Fig. 1. Thus the keys 100 in each order control the accumulator dial actuating mechanism in that order. This control is effected by clutching the dial 264 to a common accumulator drive shaft 160 for an interval determined by which particular key 100 in the associated order is depressed. More specifically, this interval is determined by clutching all the dials 264 simultaneously to the shaft 160 and declutching each dial 264 from shaft 160 selectively according to the setting in the associated order of keys.

The machine operates in cycles, each cycle, or series of cycles, being initiated by depression of either the plus key 200 or the minus key 220. During each cycle, the accumulator drive shaft 160 is rotated through a fixed angle by means of suitable gearing, from a shaft 330, as will be hereinafter described.

Each accumulator dial 264 has associated therewith a mechanism including a declutching ratchet 266 adapted to be engaged by a live tip 310 on an arresting lever 275, which lever is actuated at the beginning of each cycle to drop the live tip 310 out of engagement with the declutching ratchet 266, which causes the dial 264 to be clutched to the shaft 260, and rotated therewith. The arresting lever 275 is returned to re-engage the live tip 310 with the declutching ratchet 266 and declutch the dial 264 from the shaft 160, when the dial has been rotated the desired amount, as determined by which one of the associated keys 100 has been depressed. To this end the keys 100 in each bank control an actuator mechanism including an ordinal cam 306 and a stop arm 137, the latter being lifted to engage an ear 315 on the arresting lever 275 and carry the live tip 310 into engagement with the declutching ratchet 266 at a time determined by the particular key 100 that was depressed.

The general operation of the machine having been very briefly outlined, the selection mechanism which controls the movements of the stop arm 137 will now be described in detail.

SELECTION MECHANISM

The selection mechanism includes as its main elements the keyboard, a selection setting mechanism, and a selection locking mechanism.

*Keyboard*

Referring to Fig. 1, part of the keys in one order are indicated at 100 and are slidably mounted in a key frame rigidly attached to the frame of the machine and are normally maintained in raised position by springs 102 unless locked down by a lock bar 104 of conventional construction, as described in Patent Number 2,229,630 dated January 28, 1941. A selection bar 120 extends longitudinally below the keys 100 and is supported for longitudinal movement by parallel links 121 and 122. The selection bar 120 contains notches 124 spaced apart at intervals slightly less than the distance between the keys 100 so that in response to depression of a key the bar is cammed toward the right (Fig. 1) a distance proportional to the digital value of the key depressed.

*Selection setting mechanism*

The link 122, which is pivotally supported on a stationary stud 125, has a rearwardly extending arm 130 on which there is formed a gear segment 131 which meshes with a gear segment 132 rotatably mounted on a master cam shaft 135. Attached to the segment 132 for movement therewith is a selection arm 136 on which a stop arm 137 is pivotally mounted, by means of a stud 138.

It will be apparent that in response to depression of any of the keys 100, the stop arm 137 will be rotated clockwise about the master cam shaft 135 a distance proportional to the digital value of the key depressed.

*Selection locking mechanism*

After the selection setting mechanism described has been set by depression of one of the keys 100, the cycle of power operation is initiated in a manner to be described later, which power operation involves the rotation of the master cam shaft 135. To positively retain the selection arms 136 in the positions to which they have been set, they are locked in response to initial rotation of the master cam shaft 135. Thus referring to Fig. 2, a selection lock bail 141 is pivotally supported on a shaft 142, this bail having a horizontal flange 143 thereon, which is notched to receive a plurality of selection lock pawls 144, one for each selection arm 136 in each order of the machine. These lock pawls 144 are also pivotally mounted on the shaft 142, and are positioned by the notches in the flange 143 at the proper intervals to align with the different selection arms 136. The lock bail 141 has an arm 145 normally seated in a recess provided therefor in a cam 140 fixed to the shaft 135, as shown in Fig. 2. However, as soon as the shaft 135 rotates out of normal position, the cam 140 rocks the arm 145 downward, rotating the lock bail counterclockwise to carry the pawls 144 counterclockwise to bring noses 147 on the pawls into notches 148 formed on the selection arms 136, thereby locking all the selection mechanisms in whatever positions they were in following actuation of the keys 100. A spring 146 provides a constant tension to hold the arm 145 against the cam 140.

OPERATION INITIATION MECHANISM

Following the setting of the selection mechanism by depression of the proper keys 100, a cycle of operation is initiated by depressing either the plus key 200 or the minus key 220 (Fig. 1A). This sets the accumulator shaft 160 (Fig. 6) and the master cam shaft 135 rotating, and disengages the live tips 310 from the declutching ratchets 266 in various orders to start the accumulator dials rotating in those orders. At the same time, the rotation of the master cam shaft 135 rotates the ordinal cams 306 thereon, each associated with one of the stop arms 137. Each cam 306 has lobes 307 and 308, one of which, after an interval of time dependent upon the setting of the associated stop arm 137, and the direction of rotation of the cam, engages a roller 305 thereon to raise the stop arm 137 into the position shown at 137a in Fig. 1, and re-engage the live tip 310 with the declutching ratchet 266 to stop the accumulator dial.

The essential difference between addition and subtraction operations is that the master cam shaft 135 is rotated in opposite directions. When adding, the master cam shaft 135 and ordinal cams 306 (Fig. 1) rotate one-half of a revolution in a clockwise direction during each cycle, and lifting of the stop arms 137 is effected by engagement of roller 305 by the cam lobe which at the beginning of the cycle is in the lower position in which lobe 307, for example, is shown in Fig. 1. In subtraction, the master cam shaft 135 and ordinal cams 306 rotate in counterclockwise direction, and lifting of the stop arms 137 is effected by engagement of roller 305 by the cam lobe which, at the beginning of the cycle, is in the upper position presently occupied by lobe 308. Since each selection arm 136 (mounting the stop arm 137) is rotated clockwise by the selection mechanism a distance proportional to the value of the key 100 that was depressed, the extent of rotation of the dials 264 is proportional, when adding, to the value of the depressed key 100, and is proportional, when subtracting, to the 9's complement thereof. In other words, in the present machine, subtraction is performed by adding the 9's complement of the subtrahend into the accumulator dials, the accumulator shaft 160 being always driven in the same direction.

*Main clutch operation by plus and minus keys*

Depression of either the plus key 200 or minus key 220 actuates the main clutch of the machine to start a cycle of operations and conditions a reversing unit to determine the direction of rotation of the cam shaft 135.

Figures 4, 5, 6:
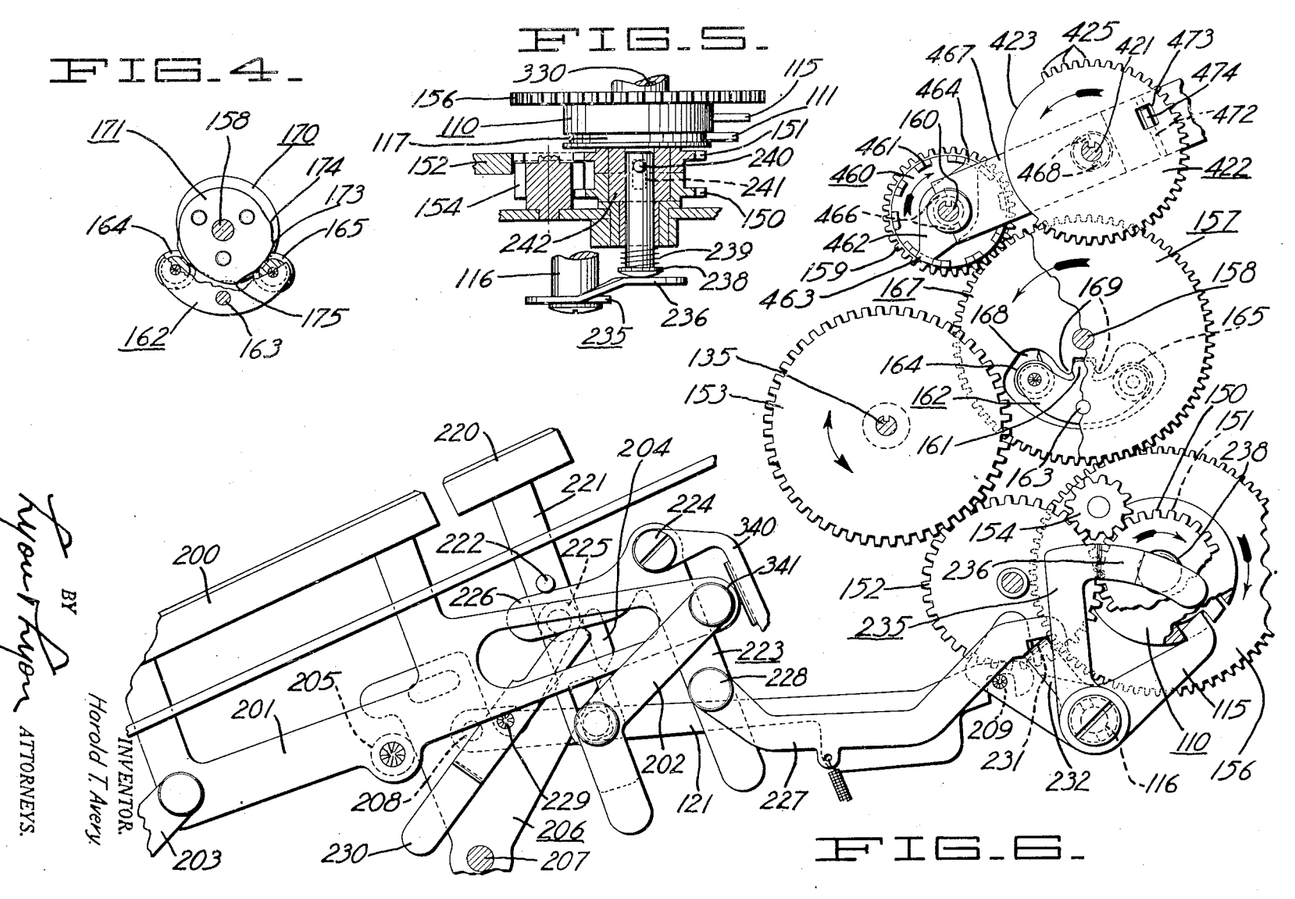
Fig. 4 is a right side fragmentary view showing part of a variable speed transmission unit used in the machine.
Fig. 5 is a top view, partly in section, of the main clutch and reverse unit.
Fig. 6 is a right side view of the plus and minus keys and the mechanism actuated thereby to control the main clutch and reverse unit.

Referring to Fig. 6, the plus key 200 is secured to a key supporting member 201 mounted for up and down movement on two parallel links 202 and 203. The supporting member 201 carries a roller 205 adapted, when the key is depressed, to engage the side of a lever 206 supported on a pivot 207, rotating the lever clockwise and shifting a link 121, which is pivotally connected to lever 206 by a pivot 208. The opposite end of the link 121 is connected by a stud 209 to a main clutch dog 115 so that, in response to depression of key 200, the clutch dog 115 is rocked clockwise to engage a main clutch 110 as described in Avery Patent No. 2,062,634.

The minus key 220 which also is capable of effecting engagement of the main clutch, is mounted on a key stem 221 carrying a roller 225, which roller overlies a diagonally extending arm 204 of lever 206 so that depression of the key rocks the lever 206 clockwise, and main clutch dog 115 to clutch engaging position.

*Reversing mechanism operation by plus and minus keys*

The manner in which the plus and minus keys 200 and 220 also condition the reversing mechanism to determine the direction of rotation of master cam shaft 135, will now be described. The reverse control mechanism includes a lever 235 (Fig. 6) secured to a rockable shaft 116, which lever 235, when in extreme counterclockwise position as shown in Fig. 6, controls the drive mechanism (to be described later) to rotate the master cam shaft 135 clockwise, for addition; on the other hand, when lever 235 is rocked clockwise, it conditions the drive mechanism to rotate the master cam shaft 135 in counterclockwise direction, for subtraction.

Also secured to the shaft 116 for rocking movement with lever 235 is a lever 232 having an ear 231 in engagement with a link 227 which is pivotally connected by a stud 228 to a bellcrank lever 223, freely pivoted on a screw 224.

As shown in Fig. 6, the mechanism is in additive condition. However, if the minus key 220 is depressed, a stud 222 thereon engages an arm 226 of the bellcrank lever 223 rotating the latter in counterclockwise direction and shifting the link 227 to the right to move the lever 235 into position for counterclockwise (subtractive) movement of the master cam shaft 135. The reversing mechanism described remains in whichever position it has been last operated. However, if, following actuation of the minus key 220 the plus key 200 is depressed, the roller 205 connected therewith engages the left end of a lever 230, rocking the latter about a stationary stud 229 and causing the opposite upper end of the lever to engage the lower surface of the arm 226 on the bellcrank lever 223 and rotate the latter clockwise back into the position shown in Fig. 6, in which the lever 235 is positioned for clockwise (additive) rotation of the master cam shaft 135.

DRIVE MECHANISM

*Main clutch*

The drive mechanism includes the main clutch 110, the reversing unit for coupling the master cam shaft 135 to the main clutch, and the mechanism for coupling the accumulator shaft 160 to the main clutch.

The main clutch 110 (Fig. 6), previously referred to, is of the ratchet type shown in the Avery Patent 2,062,634 and is driven from an electric motor, as shown in the prior patent, but not disclosed herein. The motor may operate continuously or it may be started and stopped by a switch actuated from the main clutch dog 115, as disclosed in the Avery patent.

The main clutch 110 may be centralized as shown in Fig. 3, in which a centralizer lever 111 is freely pivoted on the shaft 116, and is urged counterclockwise by a spring 112 so as to press a nose 113 into a recess 114 in an annular groove 117 (Figs. 3 and 5) in the main clutch housing, when the clutch is disengaged and reaches, or closely approaches, its centralized position.

The main clutch 110 drives the master cam shaft 135 through a reversing unit in either clockwise or counterclockwise direction, and drives the accumulator shaft 160 always in a clockwise direction, through a variable speed transmission unit.

*Reversing unit*

The lever 235 (Fig. 6) previously described in connection with the operation-initiating mechanism, carries an arcuate arm 236 which is angled as shown in Fig. 5 so that when the lever 235 is in counterclockwise position (Fig. 6) it cams a pin 238 (Fig. 5) toward the left of the machine, whereas when the lever 235 is moved clockwise (Fig. 6) arm 236 allows a spring 239 (Fig. 5) to retract the pin 238 toward the right of the machine. A lateral pin 240 (Fig 5) extends from the pin 238 through an elongated hole 241 in a bushing 242, which is integral with the driven housing of the clutch 110. This bushing 242 freely rotatably supports a pair of gears 150, 151 which also have slots to receive the pin 240. Therefore the bushing 242, driven by the clutch 110, may be selectively coupled either to gear 150 or 151, depending upon the position of the pin 238.

With the parts adjusted for addition, as shown in Figs. 5 and 6, the clutch 110 drives gear 151 in clockwise direction; gear 151 meshes with a gear 152, which in turn meshes with a gear 153 secured to shaft 135, so that gear 152 is rotated in counterclockwise direction and gear 153 and master cam shaft 135 are rotated in clockwise direction.

On the other hand, if the minus key 220 is depressed to shift the lever 235 into clockwise position, the pin 240 (Fig. 5) couples the main clutch to the gear 150 which instead of driving the gear 152 directly, drives it through a reversing idler gear 154 so that the gear 152 is rotated clockwise and the gear 153 and shaft 135 are rotated counterclockwise, for subtractive operation.

Accumulator shaft drive mechanism

The accumulator shaft 160 is coupled to the main clutch 110 through a gear train including a gear 156 on the main clutch (Figs. 5 and 6), meshing with a gear 157, which is coupled by a variable speed transmission unit to a coaxial gear 167, which in turn meshes with a gear 159 in driving relation to the accumulator shaft 160, so that whenever the main clutch rotates through a cycle the accumulator shaft 160 is rotated through a fixed angle in clockwise direction.

It is desirable to provide some mechanism in the drive between the main clutch and the accumulator shaft 160 to reduce the shock incident to starting of the dials when the accumulator clutches engage. Such a shock reducing effect is provided by the variable speed transmission unit intercoupling the two coaxial gears 157 and 167 (Fig. 6).

This unit comprises a cam follower 162 (Fig. 4) pivotally mounted on gear 157 by pivot 163 so that it revolves with gear 157. This cam follower 162 has rollers 164 and 165 at opposite ends thereof cooperating with two stationary complementary cams 170 and 171. Cam follower 162 is in the same plane as, and is mounted in, an aperture 168 (Fig. 6) in the gear 167, and the edge of the aperture defines a pair of lugs 169 (Fig. 6) which embrace a tip 161 on cam follower 162. At the time during the counterclockwise rotation of gear 157 and cam follower 162 when the accumulator clutches first engage, the roller 165 passes a lobe 173 (Fig. 4) on the cam 171, permitting the cam follower 162 to rock counterclockwise about its pivot 163. The corresponding movement of the tip 161 (Fig. 6) permits a reverse movement of the gear 167 relative to the gear 157; the net effect of which is to decelerate the gear 167 while the accumulator clutches are being engaged.

As will be explained hereinafter, accumulator clutches may also be engaged at definite, later periods in the cycle. Additional lobes 174 and 175, respectively, (Fig. 4) are provided on the cam 171 to decelerate the gear 167 at those times exactly as has been described in connection with the lobe 173. Following the drop off lobe 174, there is a gradual rise on the cam to the lobe 175, during which time reverse rocking motion of the cam follower 162 occurs, accelerating the gear 167 back into normal phase relation with the gear 157. As previously indicated, the cam 170 is complementary to the cam 171 so that cam 170, acting upon the roller 164, maintains the roller 165 in contact with the cam 171.

The net effect of the variable speed transmission unit is to decelerate the accumulator shaft 160 during the periods in a cycle of operation when an accumulator clutch may be initially engaged and to accelerate the accumulator shaft 160 during digitation when no accumulator clutch can be engaged.

Accumulator Clutches

As already briefly explained with reference to Fig. 1, there is an accumulator clutch associated with each dial 264 of the accumulator register for clutching and declutching the associated dial into and out of driven relation with the accumulator shaft 160. Each clutch includes a declutching ratchet 266 adapted to be engaged and disengaged by the live tip 310, the dial remaining stationary when the live tip 310 engages the declutching ratchet 266, as shown in Fig. 1, and rotating with the accumulator shaft 160 when the live tip 310 is withdrawn.

The clutch mechanism will now be described in detail with reference to Figs. 11, 12, 13 and 14.

Each clutch is generically identified by the reference numeral 250 and includes a ratchet disc 251 keyed to the accumulator shaft 160, adapted to be selectively engaged by an ear 256 on a clutch dog 252 pivotally mounted by a stud 254 on a supporting member 253, which is loosely mounted for rotation on the shaft 160 but is coupled to a control lever 260 (Fig. 14) by engagement of two lugs 258 thereon with an ear 259 on the control lever 260. The latter in turn is connected to the accumulator dial 264 (Fig. 12) by an ear 262 on lever 260 which extends through an aperture 263 in the dial. This ear 262 also extends through an aperture in a declutching ratchet 265 (Fig. 12), so that the clutch dog 252, dial 264 and declutching ratchet 265 are rotatable as a unit about shaft 160.

The dog 252 is constantly urged in counterclockwise direction about its pivot 254 to seat the ear 256 in one of the notches 257 of the driving ratchet disc 251, but is normally maintained out of engagement with the driving ratchet 251 by force exerted against a shoulder 274 (Figs. 11 and 13) on dog 252 by a lug 273 on a declutching ring 270.

Figure 11:
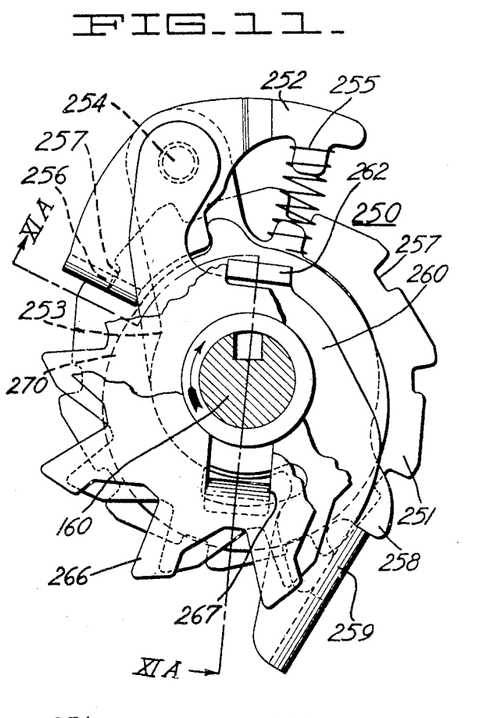
Fig. 11 is an enlarged side view of the accumulator clutch.
Figure 11A:
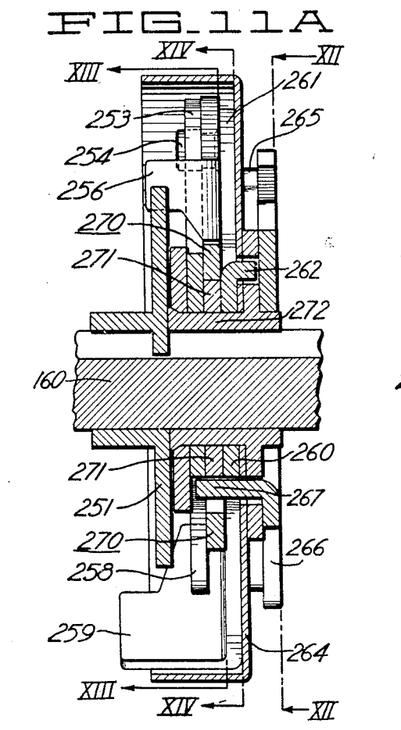
Fig. 11A is a cross section taken substantially along the line XIA—XIA of Fig. 11.
Figures 12, 13:
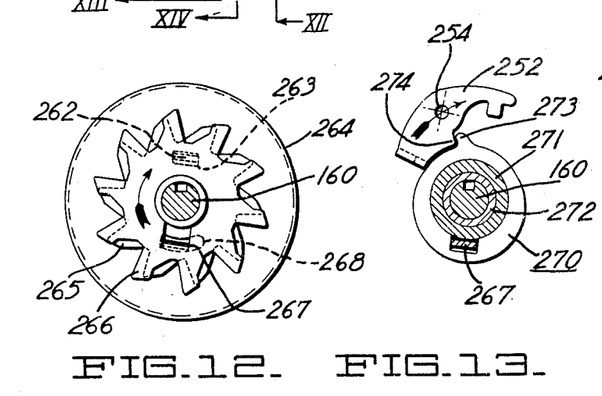
Figs. 12 to 14, inclusive, are right side sectional views of the accumulator clutch, the planes of the sections being taken as indicated in Fig. 11A.

Referring to Figs. 11 and 11A, the supporting member 253 is mounted immediately in front of ratchet disc 251, and ring 270 and dog 252 are mounted in a common plane immediately in front of the supporting member 253. The disc portion of the dials 264 (Fig. 12) is positioned in front of ring 270, the declutching ratchet 265 is positioned immediately in front of the dials 264, and the declutching ratchet 266 is positioned in front of the declutching ratchet 265. The ring 270 is rotatably supported on the shaft 160 by bushings 271 and 272, but is locked for rotation with declutching ratchet 266 by an ear 267 on the latter, which projects into an aperture in ring 270 (Fig. 13). The ear 267 of necessity also projects through a recess 268 in the declutching ratchet 265 but this recess is elongated (Fig. 12) to permit limited relative rotation between declutching ratchet 265 and declutching ratchet 266.

When the clutch mechanism is unrestrained, as shown in Figs. 11 to 14, the force of the spring 255 maintains the dog 252 in driving engagement with the ratchet disc 251 and also maintains the ring 270 rocked into its most clockwise position in which, as best shown in Figs. 11 and 12, the declutching ratchet 266 is slightly advanced clockwise with respect to the declutching ratchet 265. Under these conditions the whole clutch assembly, including the accumulator dial, is locked to the accumulator shaft 160 for rotation therewith. This condition can of course only prevail when the live tip 310 (Fig. 1) is out of engagement with the declutching ratchet 266.

Now assume that with the clutch mechanism in the position shown in Figs. 11, 12, 13 and 14, the live tip 310 (Fig. 1) is moved into engagement with the declutching ratchet 266. Declutching ratchet 266 and ring 270 are blocked against further rotation, whereas declutching ratchet 265, supporting member 253 and clutch dog 252 continue to rotate. The resultant relative rotation between declutching ring 270 and dog 252 forces lug 273 against shoulder 274 to rock dog 252 about its pivot 254 and disengage the ear 256 thereon from the ratchet disc 251, complete disengagement occurring by the time declutching ratchet 265 has rotated into position juxtaposed to declutching ratchet 266 in which it also is directly restrained against further rotation by engagement with the live tip 310 (Fig. 1).

The accumulator dial 264 will remain stationary until the live tip 310 is again disengaged from declutching ratchets 266 and 265, whereupon spring 255 will immediately rock the dog 252 into driven engagement with the ratchet disc 251, the ring 270 and declutching ratchet 266 being simultaneously advanced with respect to the declutching ratchet 265 by pressure of the shoulder 274 on dog 252 against the lug 273 (Fig. 13).

ACCUMULATOR CLUTCH CONTROL

As previously indicated, the accumulator dials 264 (Fig. 1) in the various orders, may be selectively rotated by clutching them to the accumulator shaft 160 at a fixed time early in the cycle of operation and selectively declutching each dial from the accumulator shaft 160 under the control of its associated keys 100.

Also, as previously indicated, all clutching and declutching of each dial 264 is effected by movement of the live tip 310 on the arresting lever 275 associated with that clutch. These arresting levers 275 can be rocked into clutch engaging position by rocking movement of a common bail 290 (Fig. 1) which is rocked periodically during each cycle by a cam mechanism on the main clutch shaft 330. Furthermore, a mechanism including a pawl 291 and a live tail 292 is provided in each order for selectively coupling the common bail 290 to the arresting lever 275 in that order, so that under certain conditions to be described, the arresting levers do not respond to movement of the bail 290.

*Accumulator clutch engaging mechanism*

The cam structure for engaging the accumulator clutches includes a pair of complementary cams 280 and 281 (Fig. 1) secured to the main clutch shaft 330 for rotation in clockwise direction through one complete revolution during each cycle of operation. Early in each cycle a lobe 282 on cam 280 lifts a roller 283 on a cam follower 285 rocking it clockwise about a pivot 286 and also rocking the bail 290 counterclockwise about its supporting shaft 289 through a link 288 connected between one of the supporting arms of the bail 290 and an upwardly extending arm 287 on cam follower 285.

Assuming that the pawl 291 in any order is in normal position, as shown in Fig. 1, the bail 290 engages that pawl 291 and rocks it and the associated live tail 292 (on which it is pivotally mounted by a stud 293) in counterclockwise direction about the shaft 289, on which all the live tails are free to rotate. This counterclockwise rotation of the live tail 292 is transferred through a compression spring 296 to its associated arresting lever 275, rotating the latter to disengage the live tip 310 from the associated declutching ratchet 266 and engaging that clutch with the shaft 150. Bail 290 immediately returns to normal position as the lobe 282 on cam 280 passes the roller 283, but the arresting lever 275 is retained in counterclockwise position by engagement of a nose 297 on the rear end thereof with a nose 300 on a latch 298 pivotally mounted on a shaft 299 and urged clockwise by a spring 301. Frictional engagement of the nose 297 on the arresting lever by the nose 300 on the latch 298 yieldably retains the arresting lever in whichever position it has been set. The arresting lever will therefore remain in clutch-engaging position until it is positively returned to the normal position shown in Fig. 1.

*Disengagement of accumulator clutches by the selection mechanism*

As has been previously described, the master cam shaft 135 bearing the cams 306 (Fig. 1) rotates in synchronism with the shaft 330 and prior to this rotation the associated selection arm 136 has been rocked clockwise a distance proportional to the value of the key 100 that was depressed. During addition, the shaft 135 and ordinal cams 306 rotate clockwise so that the lower lobe reaches and lifts the roller 305 at a time in the cycle dependent upon the value of the key 100 that was depressed. Of course when the roller 305 is raised the stop arm 137 is rocked counterclockwise about stud 138 to engage the ear 315 on the arresting lever 275 and re-engage the live tip 310 with the declutching ratchet 266 and stop the associated accumulator dial after it has rotated a distance proportional to the value of the key 100 that was depressed.

It is to relieve the shock incident to sudden stoppage of the accumulator dial that the live tip 310 is provided on each arresting lever 275. Thus as the nose of the live tip enters a recess in the declutching ratchet 266 the live tip is initially rocked counterclockwise about its supporting stud 311, compressing a spring 312. After a momentary yielding, the spring 312 re-expands to rock the live tip and the declutching ratchet 266 back into normal position. An ear 313 on the arresting lever 275 engages an aperture 314 in the live tip and limits the rocking movement of the latter.

If the zero key 100 in any order is actuated, the associated live tip 310 is not even disengaged from the declutching ratchet 266, because the lower lobe of cam 306 reaches roller 305 during clockwise rotation of said cam and holds the stop arm 137 against ear 315, as shown at 137a, while the bail 290 is rocked, so that rocking movement of the live tail 292 merely compresses the spring 296 without moving the arresting lever. In other words, the clutch-engaging mechanism, including the elements 291, 292, 296, 275, and 310 is disabled.

TENS-TRANSFER

Of course, in any adding machine it is necessary to provide a mechanism for "tens-transfer," i. e., adding an extra unit in an accumulator dial when the dial in the next lower order passes from nine to zero. In the present machine, tens-transfer is accomplished in the latter phase of each cycle of operation and is initiated by a second lobe 345 on cam 280, which rocks the bail 290 counterclockwise in the same manner previously described with reference to lobe 282. In the particular machine shown, this second rocking of the bail 290 occurs at approximately 323° of the main clutch cycle.

During tens-transfer, the arresting levers 275 are rocked to disengage the live tips 310 from the declutching ratchets 266 for a fixed interval only long enough to rotate the dial through an increment of "1". Therefore the arresting levers 275 are automatically restored to normal position by the bail 290 during its return movement, the bail contacting downwardly extending arms 347 on the arresting levers and rocking them clockwise sufficiently to carry the nose 297 on the rear end of each arresting lever past the nose 300 on the latch 298, the spring 301 completing the restoring movement of the arresting levers by camming action between the noses 300 and 297. The necessary reverse movement of the common bail 290 to restore the arresting levers 275 is produced by a lobe 346 on the cam 281, acting against roller 284 on the cam follower 285.

Whether or not the arresting lever 275 in any order is moved into clutch-engaging position (for a transfer) in response to this second rocking of the bail 290, depends upon the position of the pawl 291 in that order, which will be in position to be engaged by the bail 290, as shown in Fig. 1, if the dial in the next lower order passed from nine to zero during its digitation phase, but will be rocked upward to clear the bail 290 if the dial in the next lower order did not pass nine during the digitation phase of the cycle. Stated in another way, a tens-transfer is initiated simultaneously in each dial by the second rocking movement of bail 290 unless the clutch-engaging mechanism for that dial has been disabled by clockwise rocking of its associated pawl 291. Furthermore, the clutch-engaging mechanisms of all dials are normally disabled by clockwise rotation of their associated pawls 291 (by a disabling means to be described), but if the dial in the next lower order has passed from nine to zero during the digitation phase of the cycle, the disabling means is blocked.

*Tens-transfer conditioning mechanism*

For convenience, the normal position of pawl 291, as shown in Fig. 1, will be referred to as the "enabling" position, since it enables the rocking movement of the bail 290 to effect tens-transfer movement to the associated arresting lever 275. When tens-transfer is not desired in any order, the pawl 291 in that order is rocked clockwise out of the path of the bail 290 and this clockwise position will be referred to as the "disabling" position. Whether or not the pawl 291 is left in enabling position, or moved to disabling position, is determined by whether or not the dial in the next lower order has passed from nine to zero during the digitation phase of the cycle. The mechanism for actuating each pawl 291 will now be described with reference to Figs. 7, 8, 9 and 10.

Figures 7, 8, 9, 10:
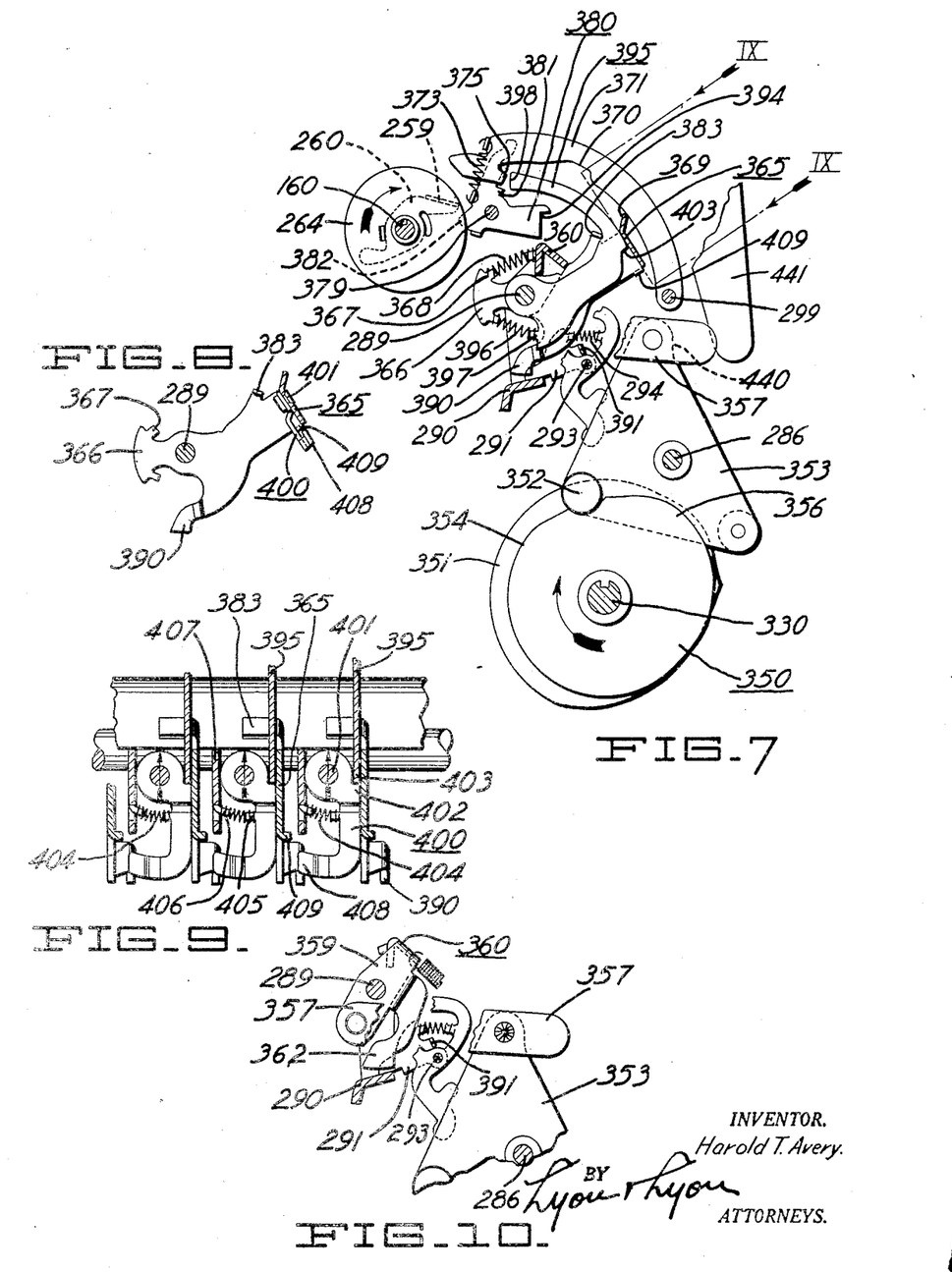
Fig. 7 is a right side view showing the general arrangement of the tens-transfer mechanism.
Fig. 8 is a detailed section of part of the transfer mechanism shown in Fig. 7.
Fig. 9 is an enlarged view of part of the transfer mechanism, taken on the line IX—IX of Fig. 7, showing the means for conditioning the machine for a chain transfer.
Fig. 10 is a right side view, showing details of the mechanism for actuating the transfer feeler mechanism.

Each pawl 291 (Fig. 7) is yieldably retained in enabling position by its associated spring 294 but can be rocked clockwise into disabling position by engagement of an ear 391 thereon by an arm 390 on a feeler bail 365 (Fig. 8), the movements of which are controlled by the movement of the dial in the said next lower order. As shown in Fig. 9, the arm 390 is deflected toward the next higher order, whereas the ear 391 (Fig. 7) in the next higher order, with which it cooperates, extends toward the next lower order, or forwardly with respect to Fig. 7.

Feeler bails 365 are yieldably rocked by a special cam mechanism in the machine, but the actual amount of movement imparted to each bail is selectively controlled and determined by its associated dial. Thus all of the feelers 365 are coupled by compression springs 368 to a common bail 360 which bail is rocked counterclockwise early in each cycle of operation by a link 357 (Fig. 10) extending from a cam follower 353 (Fig. 7), which is rocked about a pivot 286 by a pair of complementary cams 350 and 351 fixed to the shaft 330. The cam follower 353 has a roller 352 bearing against cam 350, and at the beginning of each cycle the roller 352 rises to an intermediate dwell 354 on cam 350, rocking the follower 353 clockwise and the bail 360 counterclockwise. The bail 360 urges all the feelers 365 counterclockwise through the coupling springs 368, and the initial movement of bail 360 in response to the roller 352 riding up onto the dwell 354 of the cam 350 is of such magnitude as to rotate each feeler 365 into position to bring an ear 369 thereon into a recess 370 of an associated latch 371 (pivotally mounted on a shaft 299), permitting the latch 371 to rock counterclockwise, under urge of a spring 373 tensioned between an ear on the latch and an ear on a tens-transfer lever 380. Each latch 371 has an ear 375 thereon, which, when the latch 371 drops as described, comes to a rest on top of a shoulder 381 on a tens-transfer lever 380 mounted adjacent the dial 264 in the associated order.

The foregoing operations take place early in the main clutch cycle before the digitation phase.

Figure 14:
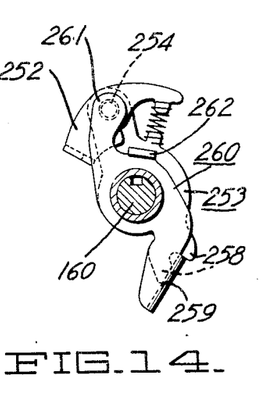

As previously mentioned with reference to Fig. 14, each dial has secured thereto a control lever 260 having an ear 259. This ear 259 (Fig. 7) is so oriented with respect to the dial that when the latter registers "9" the ear 259 is positioned, as shown in Fig. 7, immediately above a nose 382 on the tens-transfer lever 380, and when the dial passes from "9" to "0," ear 259 engages the nose 382 and rocks the lever 380 counterclockwise on its supporting shaft 379, whereupon the shoulder 381 passes from beneath the ear 375 on latch 371, and the latter drops to carry the ear 375 behind the shoulder 381, locking the tens-transfer lever 380 in counterclockwise position, in which a shoulder 394 thereon lies in blocking relation in the path of movement of an ear 383 on the feeler 365.

As a result of the foregoing operations, at the end of the digitation phase of the cycle, the shoulder 394 will be in blocking relation with the ear 383 in all orders in which the dial has passed from "9" to "0," but will be out of blocking relation to the ear 383 in any order in which the dial has not passed from "9" to "0."

After the digitation phase is completed, the roller 352 leaves the dwell 354 and rides up onto the highest part 356 of cam 350, thereby rocking the bail 360 further counterclockwise an additional amount and compressing the springs 368 to advance the feelers 365 further in counterclockwise direction. In all orders where the dial has not passed from "9" to "0" and the ten-transfer lever 380 has not been elevated into the path of the ear 383 on the feeler 365, the latter is advanced through a full stroke to carry the arm 390 (on the lower end of feeler 365) against the ear 391 on the pawl 291 in the next higher order and move that pawl 291 into disabling position. On the other hand, in all orders in which the dial has moved from 9 to 0, the feelers 365 are blocked by engagement of their ears 383 with the shoulders 394 on the associated tens-transfer levers 380, and the pawl 291 in the next higher order is left in enabling position.

Obviously, the net result of the foregoing operation is that during the transfer phase of each cycle, the pawl 291 in each order is in normal or enabling position if the next lower dial has moved from 9 to 0 during the digitation phase. On the other hand, if the next lower dial has not moved from 9 to 0 during the digitation phase, then the pawl 291 will be in upper or disabling position during the transfer phase and its associated arresting lever 275 will not be actuated to add a one into the associated dial.

*Disabling tens-transfer mechanism in rightmost dial order*

Since the rightmost dial never receives a transfer, its transfer pawl 291 (Fig. 1) must always be disabled during the transfer phase. Therefore the right supporting arm 359 (Fig. 10) of the bail 360 is provided with an extension 362 which functions in the rightmost order, the same as the extensions 390 (Fig. 7) on feelers 365 do in the other orders, to engage the ear 391 on the rightmost pawl 291 only, to move it into disabling position whenever the bail 360 is rocked during the transfer conditioning phase. Therefore during the transfer phase the rightmost accumulator clutch is never engaged.

*Simultaneous chain transfer*

The mechanism so far described takes care of the tens-transfer necessitated by movement of a dial from 9 to 0 during the digitation phase of a cycle, but is incapable of effecting tens-transfer in response to movement of a dial from 9 to 0 during the tens-transfer phase of the cycle. Obviously, however, if a dial is advanced from 9 to 0 during the tens-transfer phase, then the adjoining higher order dial must also be advanced, requiring what is termed "chain transfer."

In the present machine, chain transfer is effected by providing a mechanism which includes a nines feeler finger 395 (Fig. 7) that is normally rocked counterclockwise about shaft 289 with the feeler 365, by a spring 396 compressed between a lug on the extension 366 of feeler 365 and an extension 397 on the nines feeler finger, this spring normally maintaining the nines feeler finger against the ear 383 on feeler 365. If the associated dial is in position other than 9, the nines feeler finger is free to move with the feeler 365 during the whole range of movement of the latter, and performs no function. However, if the dial is in 9 position, then the nose 398 of the nines feeler finger 395 is intercepted by the ear 259, blocking complete counterclockwise rocking movement of the nines feeler finger and producing relative movement between it and the feeler 365. As a result of this relative movement, a shoulder 403 (Figs. 7 and 9) on finger 395 bears against a shoulder 402 (Fig. 9) on a transfer feeler hook 400, rotating the latter in clockwise direction about a stud 401 (Fig. 8) on the feeler 365, against the force of a compression spring 404 engaged between a lug 405 on the hook and a lug 406 on the left supporting leg 407 of the feeler 365. The clockwise rotation of the hook 402 as described, hooks a tip 408 thereof over an ear 409 formed on the right (with reference to Fig. 9) supporting arm of the next lower order feeler 365. It follows that if the next lower order feeler 365 moves through its full stroke to disable its associated pawl 291, then the feeler 365 in the next higher order (the dial in nine position) will likewise move through its full stroke to disable its pawl 291. On the other hand, if the feeler 365 in the lower order dial is blocked by its tens-transfer lever 380 so as not to disable its associated pawl 291, then the feeler 365 associated with the nine dial in the next higher order will also be blocked and both dials will be advanced during the transfer cycle.

Although the operation has been described specifically with reference to only two dials, obviously if there are a series of dials in 9 positions, the chain transfer mechanism described will control them all to effect simultaneous chain transfer if transfer is initiated in the lowest order of the series.

SUMMARY OF OPERATION IN ADDITION

During each cycle of operation, a number to be added is set up in the keys 100 (Fig. 1A), after which the plus key 200 is depressed. The actuation of the keys 100 rotates each selection arm 136 (Fig. 1) clockwise through an angle proportional to the value of the key actuated in that order. Depression of the plus key 200 shifts the link 121 (Fig. 6) to engage the main clutch 119, and actuates the lever 235 into position to drive the master cam shaft 135 clockwise, if the lever 235 was not already so actuated. At the same time, the accumulator shaft 160 begins its clockwise rotation.

Shortly after the start of the cycle, the lobe 282 (Fig. 1) on cam 280 engages the roller 283 and rocks the common bail 290 counterclockwise, engaging it with the pawls 291 in all the orders and rocking the live tails 292 in all orders. The movements of the live tails rock the arresting levers 275 to disengage the live tips 310 from the declutching ratchets 266 in all orders in which one of the keys 100, other than the zero key, have been depressed, thereby clutching those dials to the accumulator shaft 160 and starting them in clockwise rotation. In any order in which no key or zero key has been depressed, the live tip 310 is not disengaged from the declutching ratchet 266 because the stop arm 137 is raised against the cam 315 on the arresting lever 275 (by roller 305 riding up on lobe 307 of cam 306) and held raised while the common bail was actuated as described.

In those orders in which a key bearing a significant digit was depressed, the dials 264 continue to rotate, adding value thereinto proportional to the setting of the associated selection arm 136, rotation being finally interrupted by raising of the stop arm 137 by the lobe 307 acting against roller 305.

Early in the digitation phase, the feeler 365 (Fig. 7) of the tens-transfer mechanism in each order, was actuated by the cam 350 to bring the ear 369 on each feeler opposite the recess 370 in its associated latch 371 so that if any dial rocked the associated tens-transfer lever 380 counterclockwise by passing from 9 to 0 during the digitation phase, the lever was retained in rocked position by engagement of the ear 375 of the latch 371 behind the shoulder 381 on the lever 380.

Therefore, at the beginning of the tens-transfer phase of the cycle, the tens-transfer levers 380 are in counterclockwise position to block final counterclockwise rotation of the feelers 365, in those orders in which tens-transfer is to be effected, and during the tens-transfer phase the pawls 291 in those orders remain in normal position to couple the common bail 290 to the live tails 292 (Fig. 1) and actuate the arresting levers 275.

On the other hand, in those orders in which the dials have not passed from 9 to 0, the tens-transfer levers 380 (Fig. 7) remain in lower position in which they do not block final movement of the associated feelers 365, and the arms 390 on those feelers engage the ears 391 on the associated pawls 291, rocking them clockwise to clear the bail 290 and thereby prevent the actuation of the arresting levers 275 (Fig. 1) in those orders.

If the dial in any order went from 9 to 0 during the digitation phase and the next higher dial was left at 9, then during the tens-tranfer phase the feeler finger 395 (Fig. 7) associated with the higher dial, was blocked by the ear 259 on that dial, rotating the transfer feeler hook 400 (Fig. 9) into engagement with the ear 409 on the feeler 365 in the next lower order (the one where the dial passed from 9 to 0), so that when the feeler 365 associated with the lower of the two dials is blocked by engagement of the ear 383 thereon with the shoulder 394 of its associated tens-transfer lever 380 to prevent disabling of the pawl 291 in the next higher order (the order containing the 9 dial), the feeler 365 associated with the latter dial (the nines dial) is also restrained from disabling the pawl 291 in the next higher order, and simultaneous chain transfer occurs in the two orders.

The latches 371 (Fig. 7) are rocked upwardly following each transfer phase, to release the tens-transfer levers for movement to the position shown, so that the transfer mechanism will not be in condition to effect a transfer in those orders in which no transfer is to be entered during subsequent operations. When the cam assembly 350 returns to the position shown and the cam follower 353 is rocked counter-clockwise, upon such return, the bail 360 (Fig. 10) is rocked clockwise. The rear edge of the bail rocks each of the feelers 365 (Fig. 7) rearwardly and their ears 369 out of the recesses 370, thereby rocking the latches 371 upwardly. The ears 375 on the latches are moved from behind the shoulders 381 of the tens-transfer levers which are then free to return to the position shown under urge of the springs 373.

Of course, following counterclockwise rocking of the arresting levers 275 (Fig. 1) in those orders where tens-transfer is to occur, these arresting levers are restored by return movement of the bail 290, the bail engaging the arm 347 on the arresting levers. Extra reverse movement of the bail 290 necessary to restore the arresting levers is produced by the lobe 346 on the cam 281 acting against the roller 284 on the cam follower 285.

At the completion of the operations described, the main clutch 110 (Fig. 6) has made one complete revolution and is automatically disengaged by the dog 115, leaving the apparatus in the condition it was in at the beginning of the cycle, except for the new positions of the accumulator dials.

SUBTRACTION

The present machine performs subtraction by adding the complement of the subtrahend, which consists of the nines complement of each digit of the subtrahend except the rightmost digit thereof, which is the tens complement of the rightmost digit. The machine is therefor constructed so that when the minus bar 220 is depressed, the machine is conditioned to add the nines complement of the digit set up in each order of the keyboard, and to add an additional digit in the rightmost order.

The nines complements are obtained by rotating the ordinal cams 306 (Fig. 1) in reverse or counterclockwise direction so that the lobe of each cam which occupies the position in which lobe 308 is shown, cooperates with the roller 305 (instead of the opposite lobe, as in addition). The lobe 308 for example moves a distance complemental to that which the lobe 307 would move during addition before engaging the roller 305 and rocking the stop arm 137. For example, if the "3" key is depressed in any order, and then the minus key 220 actuated, the ordinal cam 306 (Fig. 1) is rotated in counterclockwise direction and the lobe 308 engages the roller 305 and cams the stop arm 137 upward to stop the associated dial 264 after the dial has moved six digits in a positive direction.

Fugitive digit

Subtraction by addition of complemental numbers in the manner described requires adding an extra digit into the rightmost dial only, which digit added under such circumstances is generally termed the "fugitive digit." This addition is accomplished during each subtractive cycle before digitation starts, so that the rightmost dial is advanced one digit between the time the fugitive digit mechanism operates and the time when normal digitation starts.

To this end, a cam 315 (Fig. 15) is secured to the driven side of the main clutch and is provided with a single lobe 316 so as to rock a cam follower 318 clockwise about its pivot stud 319 against the force of the spring 320, very early in the cycle. Rocking of the follower 318 engages an ear 321 on the left end thereof, with a shoulder 322 on a link 323 which is pivotally connected to a lever 324, by a stud 325, so that the lever 324 is rocked clockwise (about the shaft 330 on which it is loosely pivoted) and an ear 332 thereon engages a nose 331 on the live tail 292 associated with the rightmost accumulator dial. Therefore, the live tail 292 (Fig. 1) in the rightmost order is actuated to actuate its associated arresting lever 275 into counterclockwise position and engage the accumulator clutch in the rightmost dial.

The rightmost dial continues to rotate until stopped by its associated stop arm 137, the same as are all the other dials, the only difference being that the rightmost dial started one digit ahead of the remaining dials.

Figures 15, 16, 17, 18:
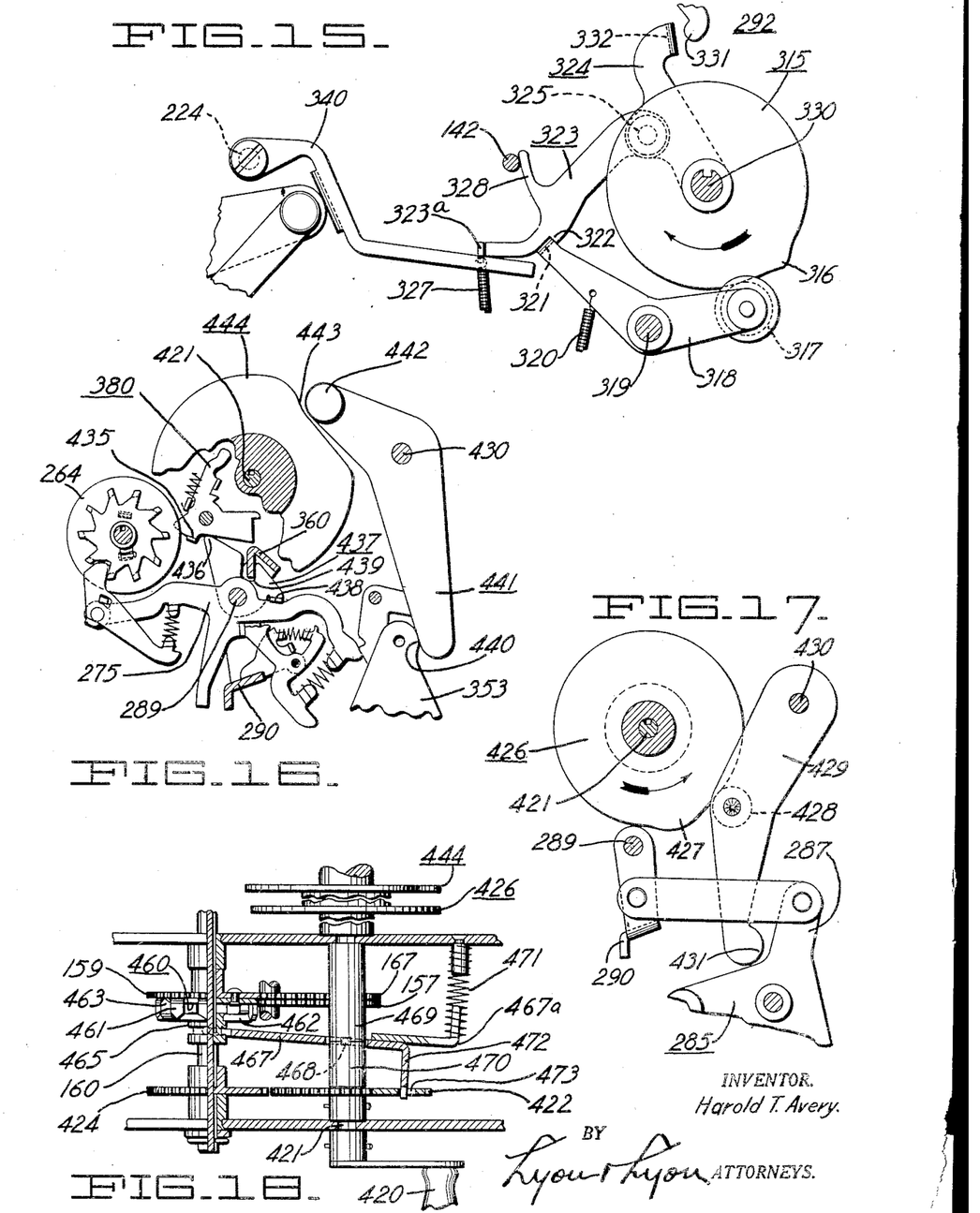
Fig. 15 is a right side view of the mechanism for effecting entry of the fugitive digit.
Fig. 16 is a right side view of the accumulator clutch controls and the means for disengaging the clutch during clearance.
Fig. 17 is a right side view of the clear cam and the means for effecting engagement of the clutch during clearance.
Fig. 18 is a sectional view, looking down, of the clearance actuating mechanism.

A spring 327 normally holds the link 323 in the position shown in Fig. 15, in which the shoulder 322 is engaged by the ear 321. The spring also functions to maintain the lever 324 in extreme counterclockwise position, as determined by an arm 328 cooperating with the shaft 142.

The fugitive digit mechanism is disabled during addition. Whenever the plus key 200 (Fig. 6) is depressed, an ear 341 thereon bears against a lever 340 pivoted on the stationary screw 224, rocking the lever 340 counterclockwise. This raises the outer end of the lever 340 (Fig. 15) against an ear 323a on the link 323 and elevates the latter to carry the shoulder 322 thereon clear of the path of ear 321 on the cam follower 318.

It will be seen, therefore, that the fugitive digit mechanism is normally maintained in operative condition, but is disabled each time the plus key 200 is depressed to initiate an addition cycle.

DIAL CLEARANCE

A clearing mechanism is illustrated particularly in Figs. 16, 17 and 18, and as shown is actuated by a hand-crank 420 (Fig. 18).

Clearance is effected by disengaging the accumulator shaft 160 (Fig. 6) from the main clutch 110 and driving it through a gear 422 which is coupled to the crank 420 (Fig. 18). At the same time, control mechanisms, one associated with each dial, are brought into action for clutching each dial to the shaft 160 until the dial is rotated into its zero position and then automatically declutching it from the shaft 160.

Mechanism for driving accumulator shaft during clearance

In the description of the accumulator shaft driving mechanism, it has heretofore been assumed that the gear 159 (Fig. 6) which normally drives the accumulator shaft 160, is permanently fixed in driving relation to the shaft. Actually, however, the gear 159 is connected to the shaft 160 by a spline clutch comprising a driving disc 460 (Fig. 18) fixed to the gear 159 and having teeth 461 extending laterally and cooperating with two teeth 463 and 464 (Fig. 6) on a driven member 462 which is keyed to accumulator shaft 160 (Fig. 18)—(although slidable therealong to bring the teeth 463 and 464 into and out of engagement with the teeth 461). The driven member 462 has a collar 465 engaged by a fork 466 (Fig. 6) on the left end of a rocking arm 467 which is pivoted by a pair of lugs 468 (Fig. 18) formed thereon and extending into slots in the abutting ends of a pair of sleeve bushings 469 and 470, which float on a clearance drive shaft 421, to which the crank 420 and gear 422 are secured.

The rocking arm 467 is urged into clutch-engaging position, as shown in Fig. 18, by a spring 471, compressed between the machine frame and an arm 467a welded to the rocking arm 467. The latter arm also has a lateral extension 472 which extends into an aperture 473 in the gear 422 (Figs. 18 and 6). The lateral extension 472 is cut diagonally at its end to form a camming surface 474 so that when the gear 422 is rotated during a clearance operation by the crank 420, the side of the aperture 473 engages the camming surface 474 and cams the rocking arm 467 counterclockwise about its lugs 468 to disengage teeth 463 and 464 from the teeth 461 (Fig. 18) and thereby disconnect the accumulator shaft 160 from the gear train leading to the main clutch. Continued rotation of the gear 422 causes the teeth 425 thereon to engage and drive a gear 424 (Fig. 18) fixed to the accumulator shaft 160 so that the latter is rotated during the clearance operation.

One complete revolution of the hand crank 420 and gear 422 rotates the accumulator shaft 160 through a sufficient angle to clear all the dials, regardless of their positions, and when the gear 422 completes its revolution the tip of the extension 472, carrying camming surface 474 (Figs. 6 and 18), again snaps into the aperture 473 in the gear, thereby retaining the latter in normal position, in which the cut-out portion 423 (Fig. 6) is juxtaposed to the gear 424, (Fig. 8), leaving the latter free to rotate independently of gear 422. At the same time that the tip 474 enters the aperture 473, the motion of the rocking arm 467 (Fig. 18) re-engages the teeth 463 with the teeth 461, restoring the accumulator shaft in driven relation with the gear train extending to the main clutch.

Accumulator clutch engagement during clearance

During the clearance cycle the arresting levers 275 (Fig. 1) associated with all dials are rocked to clutch their dials with the accumulator shaft 160 until the dials reach zero position, when the arresting levers 275 are selectively automatically actuated to declutch each dial from the shaft and stop it in its zero position.

The mechanism for actuating the arresting levers 275 into clutch-engaging position includes a cam 426 (Figs. 17 and 18) on the clearance drive shaft 421. Cam 426 has a lobe 427 which, early in the clearance cycle, engages a roller 428 on a cam follower 429, rocking the latter counterclockwise about its pivotal shaft 430 and bringing its lower end 431 against the arm 287 (Figs. 1 and 17) to rock the cam follower 285 clockwise, a notch 432 (Fig. 1) being provided in cam 281 to allow this movement when the main clutch is in neutral position.

As previously explained, the clockwise rocking of the cam follower 285 rocks the bail 290 counterclockwise (Figs. 1, 16 and 17) and engages all the accumulator clutches.

Accumulator clutch disengagement during clearance

As previously indicated, the clearance mechanism declutches each dial from the accumulator shaft 160 as the dial moves into zero position, and the mechanism for performing this operation includes the tens-transfer lever 380 (Fig. 7), which, as previously described, is rocked counterclockwise by the ear 259 on the associated dial as the latter passes from 9 to 0. This tens-transfer lever 380 has an ear 435 (Fig. 16) which, when the tens-transfer lever is rocked counterclockwise, engages a nose 436 on a lever 437, rocking the latter clockwise about its pivotal shaft 289 so that an ear 438 on lever 437 engages the rear end of the associated arresting lever 275 to rock the latter clockwise into clutch-disengaging position as soon as the dial moves into its zero position.

Clearance interlocks

It is necessary to disable the levers 437 during normal operation of the machine, so that the clutches will not be automatically disengaged as last described each time the dials pass from 9 to 0. To this end, a notch 439 (Fig. 16) is provided in each lever 437, which notch embraces the front flange of the bail 360 so that when the bail is rocked counterclockwise during each cycle of operation, the noses 436 on the levers 437 are rocked out of the paths of ears 435 on the tens-transfer levers 380, and the latter may be rocked to perform their normal functions without causing the accumulator clutch to be disengaged.

Means are also provided to prevent operation of the clearance mechanism when the accumulator shaft is being operated from the main clutch. Thus as soon as the main clutch starts, the cam 359 (Fig. 7) rocks the cam follower 358 clockwise, and a surface 440 on the latter engages a lever 441 pivoted on shaft 430 (Fig. 16). This lever 441 has a roller 442 on its upper end which normally seats into a recess 443 of a cam 444 (Fig. 18) secured to the clearance drive shaft 421. Lever 441 is normally free to be rocked clockwise by the cam 444 as it rotates during clearance, but during a main clutch cycle the surface 440 blocks movement of lever 441, and the cam 444 and the entire clearance mechanism is prevented from moving out of its normal position of rest.

Having fully described the preferred embodiments of this invention, it is to be understood that I do not wish to be limited to the exact constructions herein set forth, which may obviously be varied in detail without departing from the spirit of this invention, but only as set forth in the appended claims.

I claim:

1. In a register, a unidirectional accumulating member movable into a plurality of positions representative of different digital values, a cyclically operable driving member, a clutch operable to selectively connect said accumulator member to said driving member for movement therewith, a clutch control member movable to engaging and disengaging positions, respectively, means for moving said control member into engaging and disengaging positions to selectively move said accumulating member, including clutch engaging means for initially moving said control member to engaging position, yieldable means for retaining said member in such position after movement thereto by said clutch engaging means, and clutch disengaging means operative to render said yieldable retaining means ineffective and to return said control member to disengaging position to thereby disengage said clutch after movement of the accumulating member through a selected number of its said positions, said clutch disengaging means including a first means selectively settable according to different digital values, and a second means cooperating with and movable with respect to said first means and driven in timed relation with said driving member, and means for reversing the direction of movement of said second means relative to said first means for selectively effecting movement of said accumulator member proportional either to the digital value set in said first means or the nines complement thereof.

2. In a register having a unidirectional accumulating member rotatable through a plurality of digital positions, a cyclically operable driving mechanism therefor, a device selectively settable to different digital values for predetermining the amount of rotation of said accumulating member, a clutch interposed between said driving mechanism and said accumulating member, and means for engaging and disengaging said clutch in any of a plurality of digital positions of said accumulating member to selectively connect and disconnect the driving mechanisms to and from the accumulating member, said means comprising: a clutch control member having clutch-engaging and clutch-disengaging positions, means operable under control of said driving mechanism to move said control member to clutch-engaging position in the initial portion of a cycle to thereby cause the accumulating member to rotate with the driving mechanism, reversible timing means rotatably driven in timed relation to the rotation of said accumulating member, reversing mechanism operable to control the direction of rotation of said timing means, and means controlled jointly by said device in accordance with the setting thereof and by said timing means in accordance with the direction of rotation thereof to cause said control member to move to clutch-disengaging position.

3. In a register having a unidirectional accumulating member rotatable through a plurality of digital positions, a cyclically operable driving mechanism therefor, a device selectively settable to different digital values for predetermining the amount of rotation of said accumulating member, a clutch interposed between said driving mechanism and said accumulating member, and means for engaging and disengaging said clutch in any of a plurality of digital positions of said accumulating member to selectively connect and disconnect the driving mechanism to and from the accumulating member, said means comprising a clutch control member having clutch engaging and clutch disengaging positions, means operable under control of said driving mechanism to move said control member to clutch engaging position in the initial portion of a cycle to thereby cause the accumulating member to rotate with the driving mechanism, reversible timing means rotatable in either of two opposite directions in timed relation to the rotation of said accumulating member, reversing mechanism operable to cause rotation of said timing means in either of said two directions, and means operable under control of said selectively settable device and responsive to rotation of said timing means in one of said two directions to effect entry into said accumulating member of the value set in said settable device and responsive to rotation of said timing means in the other one of said two directions to effect entry into said accumulating member of the nine complement of the value set in said settable device.

HAROLD T. AVERY.